(12) United States Patent
Branover

(10) Patent No.: US 11,966,339 B1
(45) Date of Patent: Apr. 23, 2024

(54) SELECTING BETWEEN BASIC AND GLOBAL PERSISTENT FLUSH MODES

(71) Applicant: Advanced Micro Devices, Inc., Santa Clara, CA (US)

(72) Inventor: Alexander Joseph Branover, Chestnut Hill, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/957,205

(22) Filed: Sep. 30, 2022

(51) Int. Cl.
*G06F 12/0868* (2016.01)
*G06F 12/084* (2016.01)

(52) U.S. Cl.
CPC ........ *G06F 12/0868* (2013.01); *G06F 12/084* (2013.01); *G06F 2212/1032* (2013.01)

(58) Field of Classification Search
CPC ............... G06F 12/0868; G06F 12/084; G06F 2212/1032
See application file for complete search history.

(56) References Cited

U.S. PATENT DOCUMENTS

| | | | |
|---|---|---|---|
| 9,632,711 B1* | 4/2017 | Obr .................... | G06F 3/0619 |
| 11,455,251 B2 | 9/2022 | Branover et al. | |
| 2003/0084248 A1 | 5/2003 | Gaither et al. | |
| 2015/0268711 A1 | 9/2015 | Ramani et al. | |
| 2016/0357669 A1* | 12/2016 | Greenhalgh ........ | G06F 12/0811 |
| 2016/0378660 A1 | 12/2016 | Gendler et al. | |
| 2016/0378701 A1* | 12/2016 | Niell .................... | G06F 13/28 710/308 |
| 2017/0038999 A1 | 2/2017 | Vanka et al. | |
| 2018/0032439 A1 | 2/2018 | Jenne et al. | |
| 2018/0150220 A1* | 5/2018 | Pandian .............. | G06F 3/0659 |
| 2020/0192798 A1* | 6/2020 | Natu .................... | G06F 12/12 |
| 2021/0026800 A1* | 1/2021 | Hahn ................... | G06F 3/0619 |
| 2021/0141433 A1* | 5/2021 | Watt .................... | G06F 11/1076 |
| 2022/0147455 A1* | 5/2022 | Branover ............ | G06F 12/0868 |

OTHER PUBLICATIONS

PCT/US2023/072458, "International Seach Report and Written Opinion", PCT Application No. PCT/US2023/072458, Dec. 5, 2023, 8 pages.
PCT/US2023/072655, "International Seach Report and Written Opinion", PCT Application No. PCT/US2023/072655, Dec. 11, 2023, 8 pages.

* cited by examiner

*Primary Examiner* — Ryan Bertram
(74) *Attorney, Agent, or Firm* — FIG. 1 Patents

(57) ABSTRACT

Selecting between basic and global persistent flush modes is described. In accordance with the described techniques, a system includes a data fabric in electronic communication with at least one cache and a controller configured to select between operating in a global persistent flush mode and a basic persistent flush mode based on an available flushing latency of the system, control the at least one cache to flush dirty data to the data fabric in response to a flush event trigger while operating in the global persistent flush mode, and transmit a signal to switch control to an application to flush the dirty data from the at least one cache to the data fabric while operating in the basic persistent flush mode.

20 Claims, 9 Drawing Sheets

SELECTING BETWEEN BASIC AND GLOBAL PERSISTENT FLUSH MODES

BACKGROUND

Computer systems are susceptible to occasional events that cause them to be temporarily shut down or powered off. For example, a computer system may lose electrical power due to a power outage or another disruption in the power supply. As another example, the computer system may be manually reset by a user in response to an application program or operating system issue that "locks up" the computer system. Occasionally, such computer shutdowns can be anticipated so that data can be preserved before the shutdown. However, any data that was modified but not yet saved in persistent memory (e.g., nonvolatile memory, battery backed-up memory, a hard disk drive, etc.) will be lost due to the loss of power or reset.

DETAILED DESCRIPTION

Overview

Figure 1:
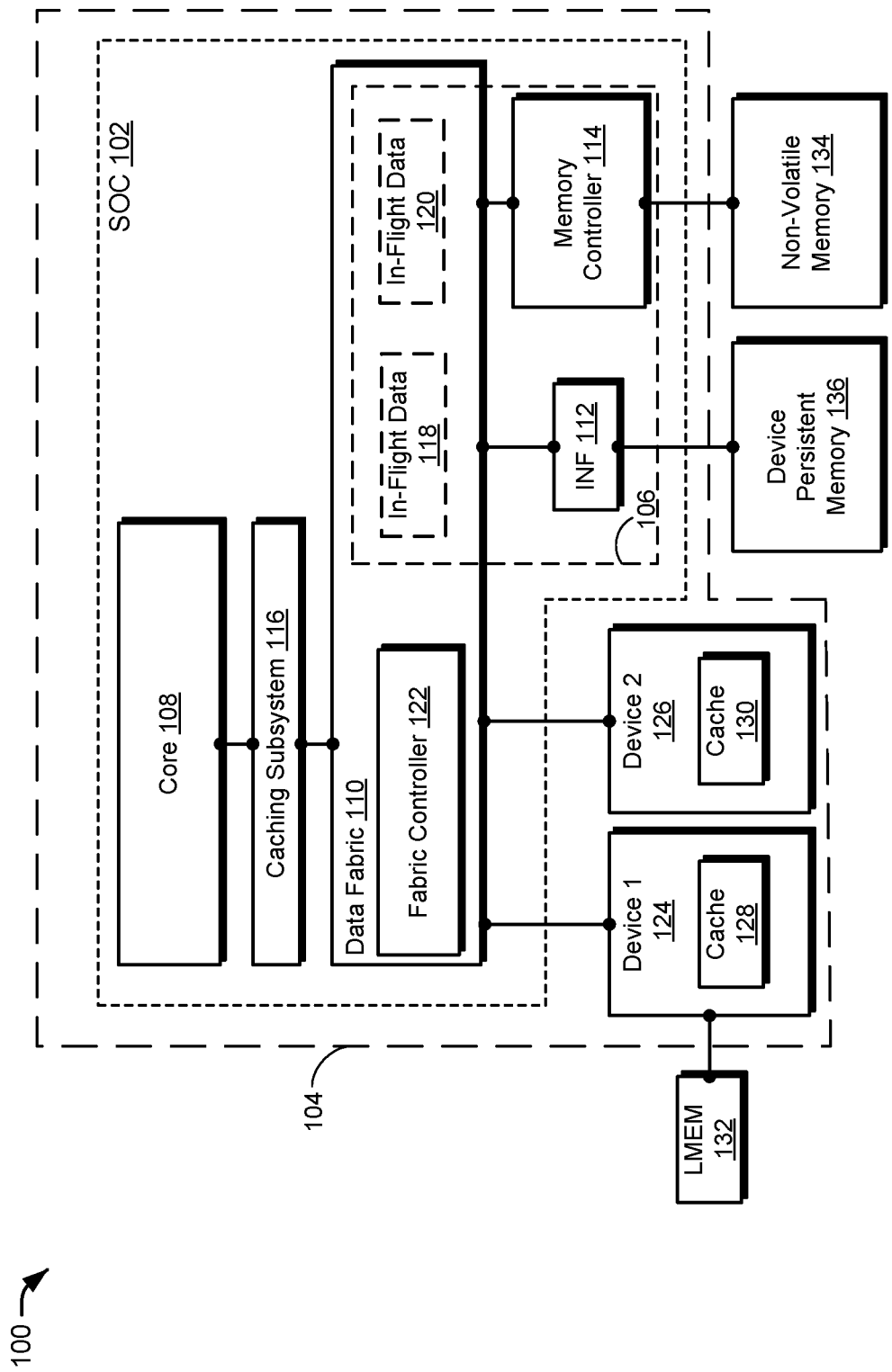
FIG. 1 is a block diagram of a non-limiting example data processing system having a system-on-chip (SOC).

Caches enable data processors to quickly access frequently used data. Data stored within a cache may be written over, such as when an application modifies the data. Generally, such written over (e.g., modified) data is marked as "dirty," and the modified, dirty data may be written back to persistent memory during a "flush" event.

A flush event can be initiated in a variety of different ways, such as via a firmware command or a software command. There are various reasons for initiating the runtime flushing of data from caches, buffers, and queues to persistence. A terminal flush event trigger includes an imminent power loss or hazardous reset, while a non-terminal flush event trigger includes a software-initiated push to persistence, e.g., to flush data for consumption by other processes or to save sensitive data on a periodic basis. Data loss occurs in such systems when there is not an adequate amount of time to push data from the caches and other structures (e.g., buffers and queues) to persistent memory before the terminal event (e.g., a power loss) occurs.

Furthermore, if a data processing system implements multiple processors, and data is exchanged between the multiple processors using distributed memory that forms one memory pool, then all of the processors must flush their caches and force serialization between different application threads to ensure a reliable backup and restore point. However, this may cause a substantial disruption in software operation. Moreover, it may be difficult to ensure data visibility and durability in larger, more complex systems, such as systems-on-chip (SOCs) with complex data fabrics for communication between different processing elements.

Additionally, different system configurations tolerate different latencies for flushing the data to persistency. Some system configurations have relatively short tolerances for saving the data, such as due to having relatively small back-up capacitors, and the operating conditions of the system (e.g., temperature) also affect the latency. Furthermore, larger data domains having more caches have a greater flushing latency than smaller data domains having fewer caches. As the flushing latency increases, a risk of data loss during a terminal event increases.

To overcome these problems, selecting between basic and global persistent flush modes is described. In accordance with the described techniques, a fabric controller selects between the basic persistent flush mode and the global persistent flush mode based on an available latency and specific system configuration for performing a global flush in a data processing system. In at least one implementation, the global flush is performed while operating in the global persistent flush mode and includes sending write requests for dirty data from one or more caches (e.g., every cache) within a global domain to a local domain. For instance, the local domain includes a data fabric and in-flight data temporarily held therein (e.g., within one or more buffers or coherent target circuits of the data fabric). The global flush further includes flushing the write requests (e.g., the in-flight data) to one or more persistent memories from the local domain (e.g., from the data fabric). In contrast, in at least one implementation, a basic (or local) flush is performed while operating in the basic persistent flush mode and includes flushing the in-flight data to the one or more persistent memories without triggering the one or more caches to send the write requests.

In at least one implementation, the fabric controller selects the global persistent flush mode in response to a predicted latency for performing the global flush being less than the available latency and selects the basic persistent flush mode in response to the predicted latency exceeding the available latency. As an example, the fabric controller determines the available latency based on power and thermal conditions of the data processing system, and the fabric controller determines the predicted latency based on a dirtiness of the one or more caches and the power and thermal conditions of the data processing system.

In one or more implementations, the fabric controller commands the cache(s) to send the write requests to the data fabric and further causes the data fabric to push the write requests to the one or more persistent memories in response to receiving a flush event trigger while operating in the global persistent flush mode (e.g., while the global persistent flush mode is selected). In contrast, while operating in the basic persistent flush mode, the controller causes the data fabric to push out the write requests to the one or more persistent memories in response to receiving the flush event trigger without commanding the cache(s) to send the write requests to the data fabric. Instead, one or more applications perform cache management while the basic persistent flush mode is selected. For example, the one or more applications transmit commands to the one or more caches or processor cores associated with these caches that cause the one or more caches to flush its contents by sending the write requests to the data fabric. The commands are transmitted in response to an indication to save sensitive data or to make modified data in the one or more caches associated with specific processor cores globally observable, for instance. In at least one implementation, the one or more applications are notified to perform the cache management in response to the fabric controller transmitting an interrupt signal (e.g., to an operating system) upon switching to the basic persistent flush mode.

The flush event trigger is either a terminal flush event trigger or a non-terminal flush event trigger. A terminal flush event trigger typically includes a power loss or hazardous reset that results in power cycling the computer system. In contrast, a non-terminal flush event trigger does not result in power cycling the computer system, and the computer system remains powered on. As such, by operating in the basic persistent flush mode in response to the predicted latency being greater than the available latency for performing the global flush, a risk of data loss during a terminal flush event is reduced. As another example, by operating in the global persistent flush mode while the predicted latency is less than the available latency, modified data in the data processing system (e.g., modified data within each cache in the global domain) is flushed automatically via hardware and without taking up software resources.

The techniques described herein provide a highly controllable runtime flushing process that does not rely on resetting or rebooting the data processing system. For example, the data processing system can be switched between operating in the global persistent flush mode and the basic persistent flush mode one or more times as the system conditions change without resetting or rebooting the data processing system. As a result, the data processing system has the flexibility to accommodate shorter and longer flushing latencies while optimizing hardware and software efficiencies. By switching between the global persistent flush mode and the basic persistent flush mode based on the predicted latency relative to the available latency, data loss is minimized while ensuring that updated data is reliably available.

A technical effect of utilizing applications to perform cache management while there is not enough available latency to perform a global push to persistence and performing the global push to persistence when there is enough available latency is that data loss during a terminal event, such as a power loss, is reduced.

In some aspects, the techniques described herein relate to a system including: a data fabric in electronic communication with at least one cache, and a controller configured to: select between operating in a global persistent flush mode and a basic persistent flush mode based on an available flushing latency of the system, control the at least one cache to flush dirty data to the data fabric in response to a flush event trigger while operating in the global persistent flush mode, and transmit a signal to switch control to an application to flush the dirty data from the at least one cache to the data fabric while operating in the basic persistent flush mode.

In some aspects, the techniques described herein relate to a system, wherein to select between operating in the global persistent flush mode and the basic persistent flush mode based on the available flushing latency of the system, the controller is further configured to: determine the available flushing latency of the system based at least on a thermal state of the system and a power state of the system, predict a global flushing latency based on a dirtiness of the at least one cache, the thermal state of the system, and the power state of the system, select the global persistent flush mode in response to the predicted global flushing latency not exceeding the available flushing latency, and select the basic persistent flush mode in response to the predicted global flushing latency exceeding the available flushing latency.

In some aspects, the techniques described herein relate to a system, wherein the signal to switch control to the application is an interrupt signal.

In some aspects, the techniques described herein relate to a system, wherein, in response to the interrupt signal, the application transmits commands that cause the at least one cache to send write requests for cache lines that contain the dirty data to the data fabric generate in-flight data in the data fabric.

In some aspects, the techniques described herein relate to a system, further including a persistent memory coupled to the data fabric, and wherein the controller is further configured to: push the in-flight data from the data fabric to the persistent memory in response to receiving the flush event trigger while operating in the basic persistent flush mode.

In some aspects, the techniques described herein relate to a system, wherein to cause the at least one cache to flush the dirty data to the data fabric in response to the flush event trigger while operating in the global persistent flush mode, the controller is further configured to: transmit a flush command signal to the at least one cache that causes the at least one cache to send write requests for cache lines that contain the dirty data to the data fabric, the write requests including in-flight data in the data fabric.

In some aspects, the techniques described herein relate to a system, further including a persistent memory coupled to the data fabric, and wherein the controller is further configured to: push the in-flight data from the data fabric to the persistent memory in response to receiving the flush event trigger while operating in the global persistent flush mode.

In some aspects, the techniques described herein relate to an apparatus, including: at least one cache of a data processing system, and a controller configured to: command the at least one cache to flush modified data to a data fabric while operating in a global persistent flush mode, and issue an interrupt signal to instruct an application to command the at least one cache to flush the modified data to the data fabric while operating in a basic persistent flush mode.

In some aspects, the techniques described herein relate to an apparatus, wherein the controller is further configured to: command the modified data to flush from the data fabric to a persistent memory in response to the controller receiving a flush event trigger while operating in the global persistent flush mode, and command the modified data to flush from the data fabric to the persistent memory in response to the controller receiving the flush event trigger while operating in the basic persistent flush mode.

In some aspects, the techniques described herein relate to an apparatus, wherein the interrupt signal to instruct the application to command the at least one cache to flush the modified data to the data fabric while operating in the basic persistent flush mode instructs the application to command the at least one cache to flush the modified data to the data fabric in response to an indication to save the modified data to the persistent memory that is independent from the flush event trigger.

In some aspects, the techniques described herein relate to an apparatus, wherein the controller is further configured to: switch between operating in the global persistent flush mode and operating in the basic persistent flush mode based on a predicted latency of flushing the modified data from the at least one cache to a persistent memory relative to an available latency, and communicate the switching via the interrupt signal.

In some aspects, the techniques described herein relate to an apparatus, wherein to switch between operating in the global persistent flush mode and operating in the basic persistent flush mode based on the predicted latency of flushing the modified data from the at least one cache to the persistent memory relative to the available latency, the controller is further configured to: operate in the global persistent flush mode in response to the predicted latency being less than the available latency, and operate in the basic persistent flush mode in response to the predicted latency being greater than or equal to the available latency.

In some aspects, the techniques described herein relate to an apparatus, wherein the controller is further configured to: determine the available latency based on conditions of the data processing system, and determine the predicted latency based on a dirtiness of the at least one cache and the conditions.

In some aspects, the techniques described herein relate to an apparatus, wherein the conditions of the data processing system include a thermal state of the data processing system and a power state of the data processing system.

In some aspects, the techniques described herein relate to a method, including: selecting, by a controller, a global persistent flush mode in response to a predicted global flush latency not exceeding an available latency for flushing caches in a data processing system to persistent memory, commanding, by the controller, the caches of the data processing system to flush to the persistent memory in response to receiving a flush event trigger while the global persistent flush mode is selected, selecting, by the controller, a basic persistent flush mode in response to the predicted global flush latency exceeding the available latency for flushing the caches in the data processing system to the persistent memory, and commanding, by the controller, in-flight data to flush to the persistent memory in response to receiving the flush event trigger while the basic persistent flush mode is selected.

In some aspects, the techniques described herein relate to a method, further including: determining the available latency for flushing the caches of the data processing system to the persistent memory based on a power state of the data processing system and a thermal state of the data processing system, and determining the predicted global flush latency based on a dirtiness of the caches of the data processing system, the power state of the data processing system, and the thermal state of the data processing system.

In some aspects, the techniques described herein relate to a method, wherein the caches are in electronic communication with the persistent memory via a data fabric, and wherein the in-flight data include write requests for dirty data from the caches that are within the data fabric.

In some aspects, the techniques described herein relate to a method, wherein the commanding, by the controller, the caches of the data processing system to flush to the persistent memory in response to receiving the flush event trigger while the global persistent flush mode is selected includes: commanding, by the controller, the caches of the data processing system to generate the in-flight data, and commanding, by the controller, the data fabric to push the in-flight data to the persistent memory.

In some aspects, the techniques described herein relate to a method, further including: transmitting, by the controller, an interrupt signal that causes a application to be notified of whether the global persistent flush mode or the basic persistent flush mode is selected, and commanding, by the application, the caches of the data processing system to generate the in-flight data while the basic persistent flush mode is selected.

In some aspects, the techniques described herein relate to a method, wherein the commanding, by the application, the caches of the data processing system to generate the in-flight data while the basic persistent flush mode is selected is independent of the controller receiving the flush event trigger.

FIG. 1 is a block diagram of a non-limiting example data processing system 100. Examples of devices in which the data processing system 100 is implemented include, but are not limited to, servers, personal computers, laptops, desktops, game consoles, set top boxes, tablets, smartphones, mobile devices, virtual and/or augmented reality devices, wearables, medical devices, and other computing devices or systems. The data processing system 100 includes an example system-on-chip (SOC) 102. In at least one implementation, multiple devices are coupled to the SOC 102, examples of which are described below. Furthermore, the data processing system 100 is shown including a global region 104 and a local region 106. The local region 106 includes a subset of the global region 104, as will be elaborated below. As an example, the local region 106 is an Asynchronous DRAM Refresh (ADR) region, and the global region 104 is an enhanced ADR (eADR) region.

In the implementation depicted in FIG. 1, the SOC 102 includes a core 108, a data fabric 110 (e.g., an interconnect fabric), an external memory interface (INF) 112, and a memory controller 114. In at least one variation, the core 108 is a processing unit (e.g., a central processing unit (CPU), a graphics processing unit (GPU), an accelerated processing unit (APU), or another type of processor) that reads and executes instructions (e.g., of a program), examples of which include to add, move, and branch data. Some implementations of the core 108 include multiple processor units (e.g., the core 108 is a multi-core processor). In various examples, each processing unit of the core 108 includes one or more dedicated internal caches and/or a shared cache. The caches associated with the core 108 are indicated as caching subsystem 116 in FIG. 1. In some variations, the dedicated internal caches include one or more of a first level 1 (L1) cache and a second level (L2) cache connected to the L1 cache, and a third level cache (L3) that is shared among the processors of the core 108 (e.g., all the processors). Some implementations include a cache coherent memory as the third level cache, and the lowest-level internal caches of the core 108 have interfaces to the cache coherent memory. In variations, the data processing system 100 includes different configurations of one or more caches.

In at least one variation, the caching subsystem 116 is coupled to the data fabric 110. The data fabric 110 is used to connect various data processor, memory, and input/output (I/O) components with various storage points for in-process write transactions via a fabric transport layer. The in-process write transactions are represented by in-flight data 118 and in-flight data 120. In at least one implementation, the in-flight data 118 and the in-flight data 120 include modified data that have been sent for persistence and have not yet been written to memory. By way of example, the in-flight data 118 and the in-flight data 120 include pending write requests from caching subsystem 116. The data fabric 110 includes a plurality of ports and components, non-limiting examples of which include I/O controllers, an I/O hub, a cache coherent interconnect for accelerators controller (ACM), and coherent target circuits, interconnected through the fabric transport layer. For example, the coherent target circuits support various memory channels and enforce coherency and transaction ordering, such as during a runtime global push to persistence. The coherent target circuits track coherency and address collisions and support for outstanding transactions. By way of example, the in-flight data 118 is processed through a first coherent target circuit, and the in-flight data 120 is processed through a second coherent target circuit. I/O controllers of the data fabric 110 include various controllers (e.g., digital I/O controllers) and their physical layer interface circuits for protocols such as Peripheral Component Interconnect Express (PCIe) and the like. For example, the I/O controllers perform data link layer protocol functions associated with PCIe, Compute Express Link (CXL), or other protocol transactions.

The data fabric 110 further includes a fabric controller 122. In some examples, the fabric controller 122 is a microsequencer. Although the fabric controller 122 is shown within the data fabric 110, it should be understood that in other examples, the fabric controller 122 is located elsewhere and operatively coupled to the data fabric 110. In one or more implementations, the fabric controller 122 is a hardware controller that offloads application software, operating system, or system firmware from the task of recognizing and responding to runtime global push to persistence requests when operating in a global persistent flush mode, as will be elaborated below with respect to FIG. 2. A global push to persistence (also termed "global flush" and "global persistent flush" herein) flushes dirty cache data within the global region 104 via hardware signals. As will be further described herein with reference to FIG. 3A, the fabric controller 122 also instructs one or more applications to generate local push to persistence requests when operating in a basic persistent flush mode. A local push to persistence (also termed "basic flush" and "basic persistent flush" herein) flushes dirty cache data within the local region 106 via explicit commands, such as commands transmitted by an application. In one or more implementations, the explicit commands are software commands. As will be elaborated below, in at least one implementation, the application is executed via a processor (e.g., the core 108) and includes instructions to transmit the explicit commands in response to operating in the basic persistent flush mode.

The data processing system 100 further includes a first device 124 and a second device 126 coupled to the data fabric 110, such as through an interconnect block and physical interface circuits. In this example, each of the first device 124 and the second device 126 includes an internal cache. In particular, the first device 124 includes a cache 128, and the second device 126 includes a cache 130. A device local memory (LMEM) 132 is also coupled to the first device 124 in this example. Examples of the first device 124 include a type 2 CXL device, such as an accelerator with memory or a parallel accelerated processor. Another example of the first device 124 is a graphics processing unit (GPU). Examples of the second device 126 include a type 1 CXL device, such as an accelerator or caching device. In one or more implementations, the first device 124 and the second device 126 have coherent memory access with the core 108 via the data fabric 110.

In variations, the memory controller 114 is coupled to a non-volatile memory 134, such as through a physical interface circuit. The memory controller 114 performs command buffering, re-ordering, and timing eligibility enforcement for utilization (e.g., efficient utilization) of a bus between the memory controller 114 and the non-volatile memory 134. Examples of the non-volatile memory 134 include flash memory and persistent random-access memory. Further examples of the non-volatile memory 134 include, but are not limited to, a single in-line memory module (SIMM) and a dual in-line memory module (DIMM). In some variations, the non-volatile memory 134 is a double data rate (DDR) and/or non-volatile dual-inline memory module with persistent storage ("NVDIMM-P") memory. The non-volatile memory 134 is a storage class local memory in the present example. The non-volatile memory 134 is configured in different ways in variations without departing from the spirit or scope of the described techniques.

In this example, the SOC 102 is further coupled to a device persistent memory 136 via the external memory interface 112. In various implementations, the external memory interface 112 is a coherent network layer interface that routes traffic to external coherent memory devices, including the device persistent memory 136. As a non-limiting example, the device persistent memory 136 is a type 3 CXL memory device (e.g., a CXL memory with no accelerator, such as a memory expander/buffer), and the external memory interface 112 is capable of using CXL protocol memory transactions for making and fulfilling memory access requests to the device persistent memory 136. The device persistent memory 136 is configured in different ways in variations without departing from the spirit or scope of the described techniques.

In some examples, such as the example shown in FIG. 1, the in-flight data 118 is routed to the device persistent memory 136, while the in-flight data 120 is routed to the non-volatile memory 134. Thus, in one or more implementations, the in-flight data 118 and the in-flight data 120 correspond to in-process memory write transactions for different memory map locations.

In at least one implementation, the SOC 102 is coupled to other SOCs that have their own attached storage that is visible to processors in memory map (e.g., all the processors). Therefore, in variations, the SOC 102 includes a global memory interface controller for inter-chip communication to the other SOCs. Additionally or alternatively, additional external coherent memory devices are coupled to the SOC 102 (e.g., in addition to the device persistent memory 136).

The data interface and distributed memory hierarchy of SOCs like the SOC 102 can be complex, layered, and distributed. This complex interconnect fabric presents challenges for completing a runtime push to persistence that are addressed by the techniques described herein.

Figure 2:
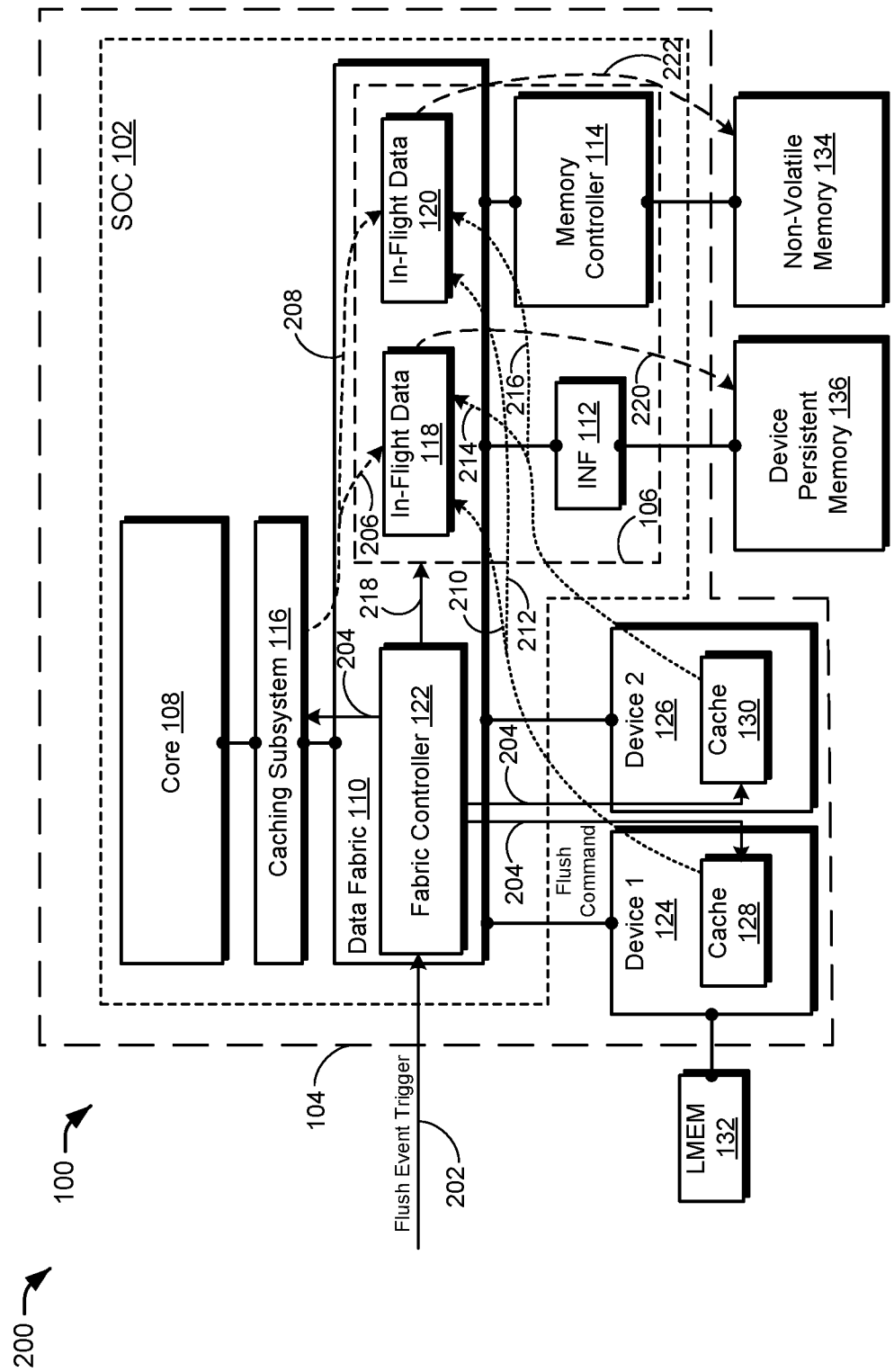
FIG. 2 depicts a non-limiting example of a data processing system performing a global push to persistence.

FIG. 2 depicts a non-limiting example 200 of the data processing system performing a runtime global push to persistence in block diagram form. In the non-limiting example 200, the data processing system 100 is operating in a global persistent flush mode where hardware of the data processing system 100 automatically flushes the caches within the global region 104. In one or more implementations, the fabric controller 122 initially receives a flush event trigger 202. The flush event trigger 202 is one of a terminal event trigger (also termed "terminal flush event trigger") or a non-terminal event trigger (also termed "non-terminal flush event trigger"). The terminal event trigger is received in response to an event like a hazardous reset request, an imminent power failure, a thermal overload or "trip" condition, or any other condition that indicates the need to imminently terminate the operation of the data processing system 100. The non-terminal event trigger is received in response to a non-terminal event like encountering a certain address, detecting low processor utilization, encountering a certain time of day, detecting a certain elapsed time since a previous runtime global push to persistence operation, or detecting a certain level of "dirtiness" in one or more caches, and the like. The non-terminal event trigger allows the system to push highly sensitive data like journal logs, shadow paging, etc. to external persistent memory on a periodic basis.

In response to receiving the flush event trigger 202, the fabric controller 122 commands caches and buffers attached to the data fabric 110 to flush pending memory transactions to persistent memory (e.g., the device persistent memory 136 and the non-volatile memory 134) via a flush command 204. In one or more implementations, the caches within the global region 104 (e.g., all the caches) are flushed to the data fabric 110 (e.g., each cache that is attached to the data fabric 110 is flushed to the data fabric 110). FIG. 2 shows the flush command 204 being transmitted from the fabric controller 122 to the caching subsystem 116 of the core 108, the cache 128 of the first device 124, and the cache 130 of the second device 126. As such, the fabric controller 122 transmits the flush command 204 to one or more devices having a cache within the global region 104.

In some examples, the flush command 204 represents firmware running on the fabric controller 122 that examines the status of each line in each cache in the global region 104 and selectively causes dirty cache lines to be written to memory. Additionally or alternatively, the flush command 204 is an explicit hardware signal sent to each of the caches that cause them to automatically flush dirty data by examining cache lines and writing cache lines that contain dirty data to main memory. A per cache way "dirty" indication can speed up the process of cache flushing. Those cache ways in which the "dirty" indication is cleared (or not present) are skipped by the cache flush process in at least one variation. As such, the cache flush process is performed via hardware, firmware, or a combination of hardware and firmware.

In response to receiving the flush command 204, the caching subsystem 116 flushes the dirty data held therein to the data fabric 110. For example, the caching subsystem 116 sends write requests with the dirty data to the data fabric 110, indicated by data flow paths 206 and 208. In the example shown in FIG. 2, write requests from the caching subsystem 116 that are mapped to the device persistent memory 136 are temporarily stored as the in-flight data 118 (e.g., in a first buffer/coherent target circuit), while the write requests from the caching subsystem 116 that are mapped to the non-volatile memory 134 are temporarily stored as the in-flight data 120 (e.g., in a second buffer/coherent target circuit). Similarly, the dirty data from the cache 128 and the cache 130 are flushed to the data fabric 110 in response to receiving the flush command 204 from the fabric controller 122. Write requests from the cache 128 and the cache 130 that are mapped to the device persistent memory 136 are represented by data flow paths 210 and 214, respectively, and are temporarily stored in the data fabric 110 (e.g., in the first buffer/coherent target circuit) as the in-flight data 118. Write requests from the cache 128 and the cache 130 that are mapped to the non-volatile memory 134 are represented by data flow paths 212 and 216, respectively, and are temporarily stored in the data fabric 110 (e.g., in the second buffer/coherent target circuit) as the in-flight data 120.

The fabric controller 122 causes the in-flight data 118 and 120 present within the data fabric 110 and associated interface circuits to complete and drain through a buffer point in the data fabric 110 to the corresponding memory map location, such as via a fabric flush command 218. In the non-limiting example 200, the in-flight data 118 is sent to the device persistent memory 136, as indicated by a data flow path 220, and the in-flight data 120 is sent to the non-volatile memory 134, as indicated by a data flow path 222. Thus, in response to the flush event trigger 202, the fabric controller 122 causes the data fabric 110 to push writes out to the device persistent memory 136 and the non-volatile memory 134.

In one or more variations, the fabric controller 122 further allows passage of reads. In another example, the memory controller 114 stores dynamic random access memory (DRAM) writes in its internal command queue. In response to the flush event trigger 202, the fabric controller 122 causes the memory controller 114 to send writes to the non-volatile memory 134 without acting on pending reads while continuing to observe efficiency protocols such as a preference for combining writes to open pages over writes to closed pages. Thus, the "in-flight" memory operations in data communication fabrics, buffers, memory controllers, and the like are completed as part of runtime global push to persistence to achieve data durability of the system.

In one or more implementations, the fabric controller 122 prioritizes speed over lowering power consumption in response to a terminal event trigger and prioritizes lowering power consumption over speed in response to a non-terminal event trigger. For example, in response to a terminal event trigger, the fabric controller 122 stalls the operation of the core 108 and other data processors, causes the caching subsystem 116 and the caches 128 and 130 to send dirty data in any cache to the data fabric 110, and then commands caches and buffers in the data fabric 110 to flush all pending memory transactions to the device persistent memory 136 and the non-volatile memory 134. In contrast, in response to a non-terminal event trigger, the fabric controller 122 causes the caching subsystem 116 and the caches 128 and 130 to send dirty data to the data fabric 110 without stalling the core 108, allows the data fabric 110 to push out the data over time (e.g., without an explicit command and/or according to a schedule), and resumes operation without a reset.

In some variations, the fabric controller 122 shares a verification signal with one or both of the device persistent memory 136 and the non-volatile memory 134 that enables the fabric controller 122 to verify that the data has been properly flushed from the data fabric 110 to the corresponding persistent memory. In some examples, the verification signal is a handshake signal. The global push to persistence is completed in response to the corresponding persistent memory returning the verification signal to the fabric controller 122, at least in some examples.

In response to a persistency loss, which is identified by setting a "loss" flag in the non-volatile memory 134, for example, an application restarts at a last known-to-be-trusted state. That is, the application performs a checkpoint rollback and replay. For example, in some implementations, a "persistence loss" error is logged, and on boot-up, system basic input-output system (BIOS) firmware identifies the persistence loss and reports through an advanced configuration and power interface (ACPI) objects (e.g., "NFIT" object). In some implementations, "persistence loss" is captured in a log so that an operating system can learn directly about the event by accessing the log status.

During one or more operating conditions and/or in one or more system configurations, there may not be enough available latency to flush the global region 104 to persistence during a terminal event. In a non-limiting example, the system includes smaller, lower cost back-up capacitors that give a shorter tolerance (e.g., less than 1 millisecond, less than 1 microsecond) for writing back dirty data to the persistent memory. Furthermore, the tolerance of the system is affected by operating conditions such as temperature.

Figure 3A:
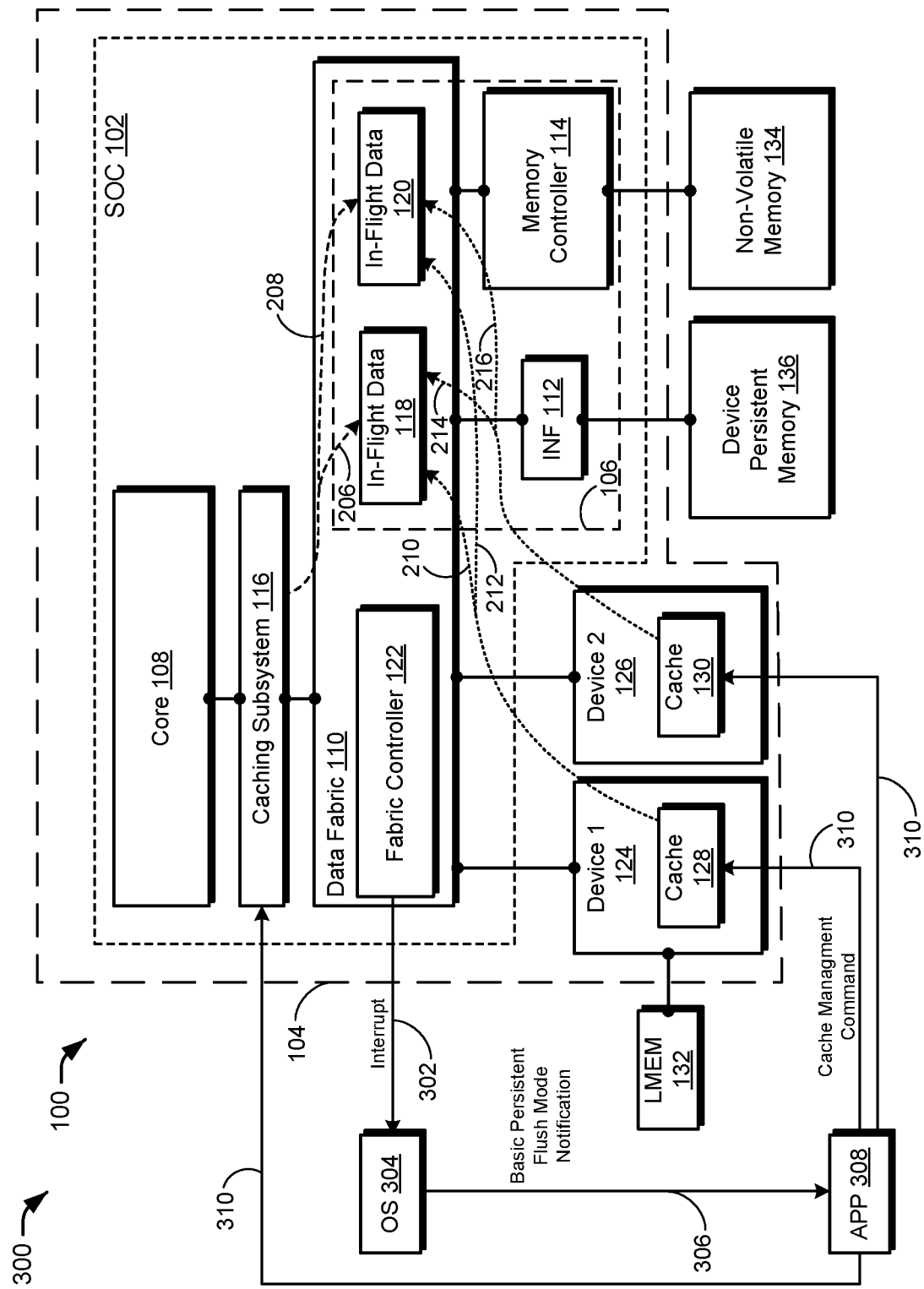
FIGS. 3A and 3B depict a non-limiting example of a data processing system performing a local push to persistence.
Figure 3B:
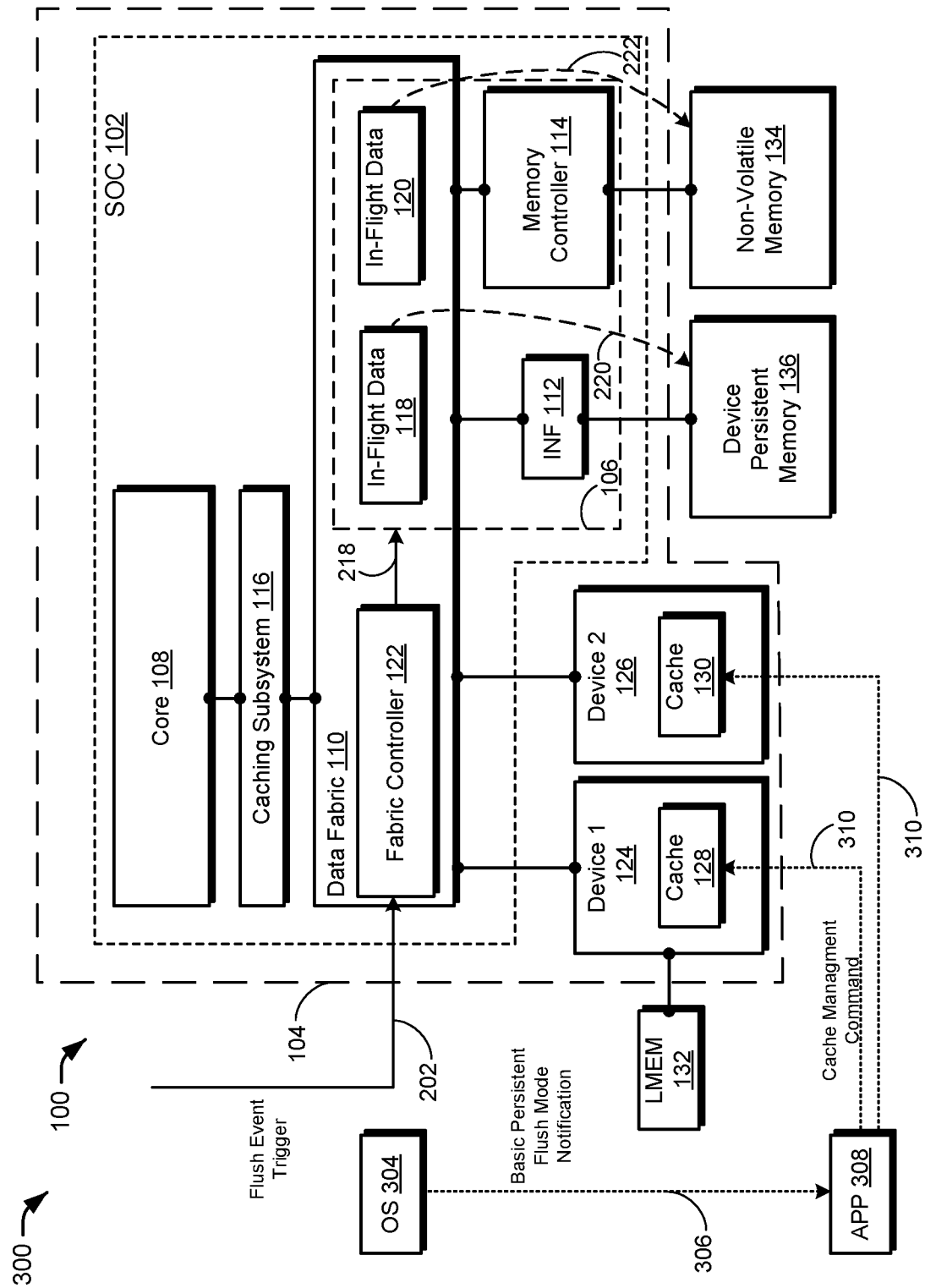

FIGS. 3A and 3B depict block diagrams of a non-limiting example 300 of the data processing system performing a runtime local push to persistence. Referring first to FIG. 3A, the data processing system 100 is switched to operating in a basic persistent flush mode in response to an interrupt signal 302 from the fabric controller 122. In one or more implementations, the fabric controller 122 issues the interrupt signal 302 responsive to determining that there is not enough available latency for performing the global persistent flush described with respect to the non-limiting example 200. By way of example, the fabric controller 122 transmits the interrupt signal 302 to an operating system (OS) 304. As an example, the operating system 304 manages hardware and software resources for the data processing system 100, and so the interrupt signal 302 instructs the operating system 304 to adjust operation of the hardware and software resources in accordance with the basic persistence flush mode.

Accordingly, in response to receiving the interrupt signal 302, the operating system 304 transmits a basic persistent flush mode notification 306 to an application (APP) 308. The basic persistent flush mode notification 306 instructs the application 308 that the global persistent flush will not be performed and that the application 308 is responsible for writing back sensitive data that is modified in the caching subsystem 116, the cache 128, and the cache 130. As such, in at least one implementation, the application 308 is instructed to control flushing of the cache(s) of the data processing system 100 in response to the interrupt signal 302.

In response to receiving the basic persistent flush mode notification 306, the application 308 switches to operating in the basic persistent flush mode. While operating in the basic persistent flush mode, the application 308 transmits (e.g., issues) a cache management command 310 to one or more caches of the data processing system 100. By way of example, the application 308 includes instructions executed on a processor (e.g., the core 108) to transmit the cache management command 310 to the caching subsystem 116, the cache 128, and/or the cache 130 to generate in-flight data (e.g., the in-flight data 118 and/or the in-flight data 120) while operating in the basic persistent flush mode. Unlike the hardware and/or firmware-based flush command 204 transmitted by the fabric controller 122 while operating in the global persistent flush mode (see FIG. 2), the cache management command 310 is a command, e.g., a software command, that instructs the one or more caches of the data processing system 100 (e.g., the caching subsystem 116, the cache 128, and/or the cache 130) to write back modified data to the data fabric 110. Although the cache management command 310 is shown being transmitted to each of the caching subsystem 116, the cache 128, and the cache 130, in variations, the application 308 transmits the cache management command 310 to one or a subset of the caches of the data processing system 100 at a given time depending on the contents held within each cache. For example, the application 308 transmits the cache management command 310 to one or more caches in response to the one or more caches holding sensitive data and/or to make the modified data held therein globally observable.

In response to receiving the cache management command 310 from the application 308, the receiving cache(s) flush dirty data held therein to the data fabric 110. As described above with respect to FIG. 2, write requests from the caching subsystem 116 that are mapped to the device persistent memory 136 are temporarily stored as the in-flight data 118 (e.g., via the data flow path 206), and the write requests from the caching subsystem 116 that are mapped to the non-volatile memory 134 are temporarily stored as the in-flight data 120 (e.g., via the data flow path 208). Similarly, write requests from the cache 128 and the cache 130 that are mapped to the device persistent memory 136 are temporarily stored as the in-flight data 118 (e.g., via the data flow paths 210 and 214, respectively), and write requests from the cache 128 and the cache 130 that are mapped to the non-volatile memory 134 are temporarily stored as the in-flight data 120 (e.g., via data flow paths 212 and 216, respectively).

Referring now to FIG. 3B, when the fabric controller 122 receives the flush event trigger 202 while operating in the basic persistent flush mode, the fabric controller 122 causes the in-flight data in the local region 106 to flush to the persistent memory via the fabric flush command 218. As described above with respect to FIG. 2, the fabric flush command 218 causes the in-flight data 118 and 120 present within the data fabric 110 and associated interface circuits to complete and drain through buffer points in the data fabric 110 to the corresponding memory map location.

Thus, in response to the flush event trigger 202 while operating in the basic persistent flush mode, the fabric controller 122 causes the data fabric 110 to push writes out to the device persistent memory 136 and the non-volatile memory 134 without transmitting other commands to get the data in-flight. Instead, the in-flight data 118 and 120 are generated via explicit commands, such as the cache management command 310 from the application 308, when the basic persistent flush mode is selected. In this way, the basic persistent flush pushes in-flight data from the local region 106 to the persistent memory.

As mentioned above, the data processing system 100 is switched to operating in the basic persistent flush mode in response to there being insufficient latency to perform a global persistent flush. Furthermore, the data processing system 100 is switched back to operating in the global persistent flush mode in response to there being sufficient latency to perform the global persistent flush. Example relationships between different operating conditions and the flushing latency will now be discussed in order to demonstrate how the flushing latency can change throughout system operation.

Figure 4:
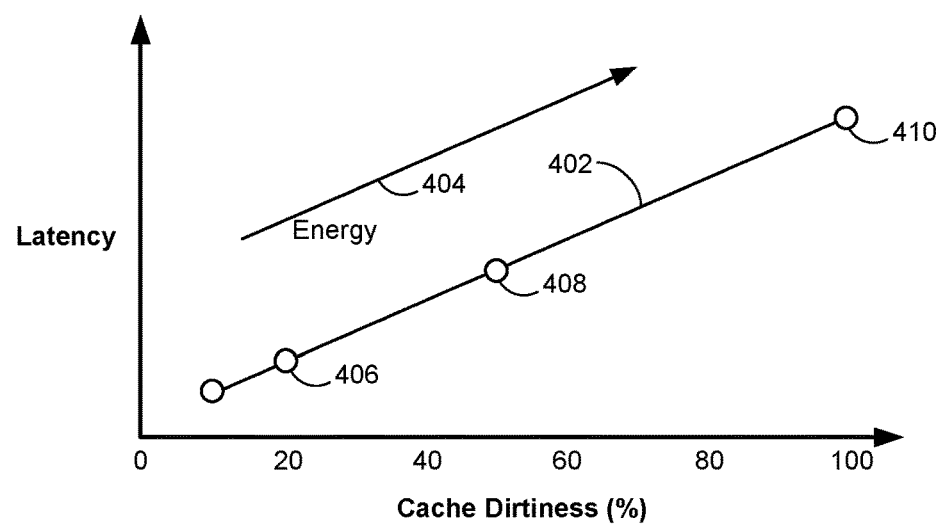
FIG. 4 shows an example graph relating cache dirtiness to a latency for performing a runtime global push to persistence.

FIG. 4 shows a non-limiting example graph 400 relating cache dirtiness (horizontal axis) with the latency (vertical axis) of performing the global flush (e.g., the flushing latency). The cache dirtiness is shown as a percentage. For example, 100% cache dirtiness refers to all of the cache ways (e.g., of one or a combination of the caching subsystem 116, the cache 128, and the cache 130) having modified data and being indicated as "dirty," and 0% cache dirtiness refers to none of the cache ways being indicated as "dirty." The latency increases along the vertical axis from the bottom to the top (e.g., in the direction of the axis arrow). The latency is measured in units of time, such as milliseconds.

As shown by a plot 402, as the cache dirtiness increases, the latency for performing the global flush increases. For example, there is more dirty data to transport from the cache to the data fabric 110 and to the device persistent memory 136 and the non-volatile memory 134. Further, as the cache dirtiness increases, an energy consumed in performing the global flush also increases, as shown by an arrow 404. By way of comparison, a first data point 406 on the plot 402 corresponds to a first cache dirtiness (e.g., approximately 20% dirtiness), a second data point 408 on the plot 402 corresponds to a second cache dirtiness (e.g., approximately 50% dirtiness) that is greater than the first cache dirtiness, and a third data point 410 on the plot 402 corresponds to a third cache dirtiness (e.g., approximately 100% dirtiness) that is greater than the second cache dirtiness. The latency and energy values for executing the global flush at the first cache dirtiness (the first data point 406) are lower than those for performing the global flush at the second cache dirtiness (the second data point 408) and the third cache dirtiness (the third data point 410). Furthermore, the latency and energy values for executing the global flush at the third cache dirtiness are greater than those for performing the global flush at the second cache dirtiness.

The relationship shown in the non-limiting example graph 400 enables a prediction to be made regarding how long it will take to perform the global flush based on the cache dirtiness. As will be elaborated below with respect to FIG. 6, in order to ensure that there is sufficient time available to write all of the modified data to memory in a terminal event, the data processing system 100 may switch to operating in the basic persistent flush mode when there is insufficient time to perform the global flush.

Figure 5:
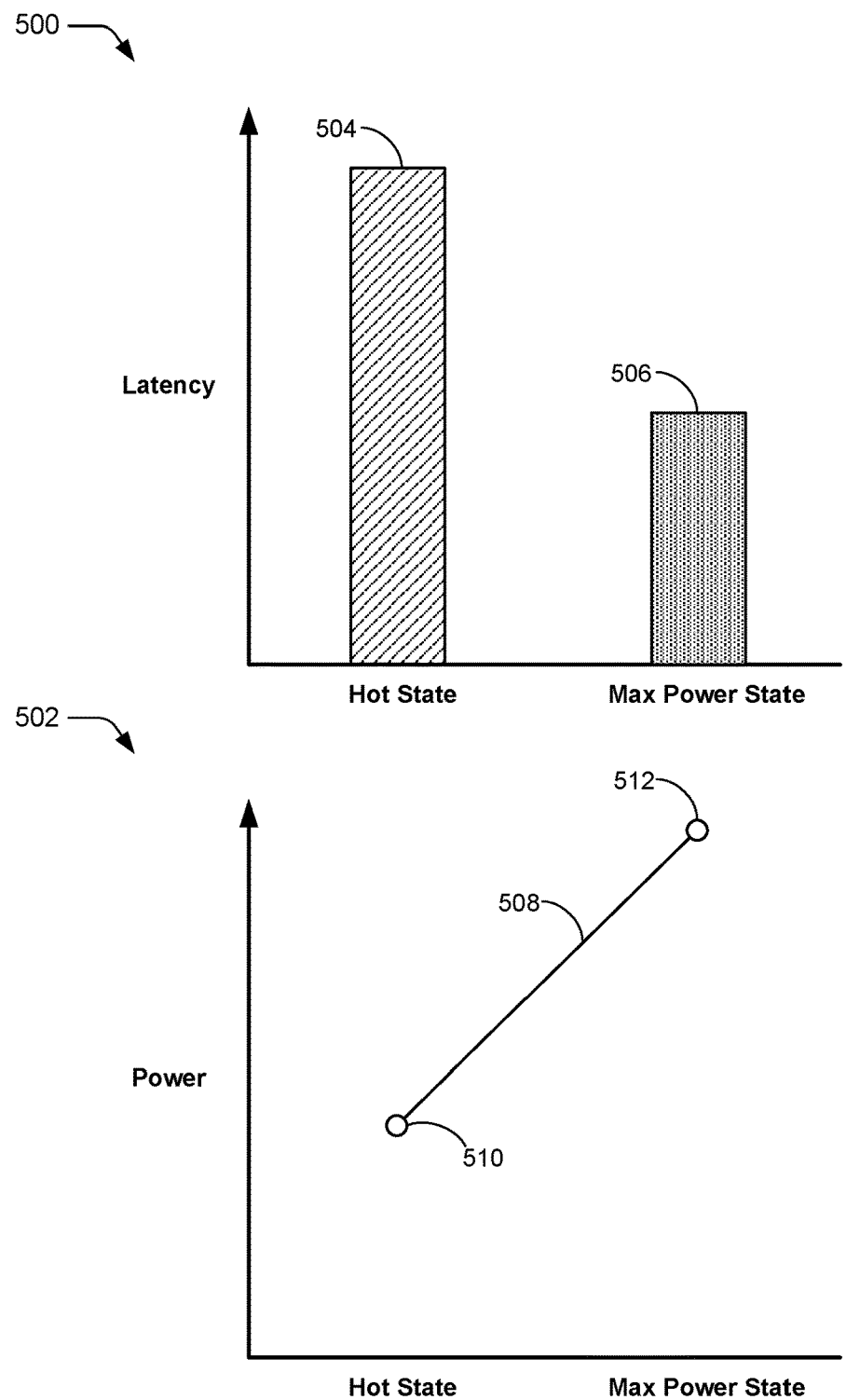
FIG. 5 shows an example graph demonstrating latency and power values for performing a runtime global push to persistence with respect to different operating states of a data processing system.

Furthermore, as mentioned above, different power and temperature states also affect the flushing latency. FIG. 5 shows a first non-limiting example graph 500 demonstrating latency values for performing a runtime global push to persistence with respect to different operating states of a data processing system (e.g., the data processing system 100) and a second non-limiting example graph 502 demonstrating power values for performing the runtime global push to persistence with respect to the different operating states. The vertical axis of the first graph 500 represents the latency, and the vertical axis of the second graph 502 represents the power. The latency and the power increase along the corresponding vertical axis from bottom to top (e.g., in the direction of the axis arrows). For each of the first graph 500 and the second graph 502, the horizontal axis indicates the operating state of a processor of the data processing system (e.g., the core 108). In the non-limiting examples of the first graph 500 and the second graph 502, the operating states include a hot state and a maximum (e.g., "max") power state. The hot state refers to an elevated temperature state of the processor. In at least one example, the hot state is determined based on an output of a thermal sensor and corresponds to a measured temperature that is above a threshold temperature. By way of example, the threshold temperature refers to a pre-determined, non-zero temperature value that may occur, for example, when the processor is under increased load (e.g., 75-100% of its load capacity). Although two states are shown in FIG. 5, it is to be understood that other states are possible that have other associated power and latency values for executing the global flush.

The latency of the two different operating states is represented in bar graph form on the first graph 500, including a first bar 504 indicating the latency for the hot state and a second bar 506 indicating the latency for the maximum power state. The power usage of the two states is represented by a line graph 508 on the second graph 502. A first data point 510 of the line graph 508 represents the power for the hot state, whereas a second data point 512 of the line graph 508 represents the power for the maximum power state. As demonstrated in the non-limiting examples of the first graph 500 and the second graph 502, the hot state has a higher flushing latency (the first bar 504) and a lower power usage (the first data point 510) than the maximum power state when pushing a same amount of data (e.g., a same cache dirtiness) to persistency. As such, a runtime decision may be made regarding whether to operate in the global persistent flush mode or the basic persistent flush mode due to the different power requirements, thermal requirements, and available latency based on a current operating state of the data processing system.

Figure 6:
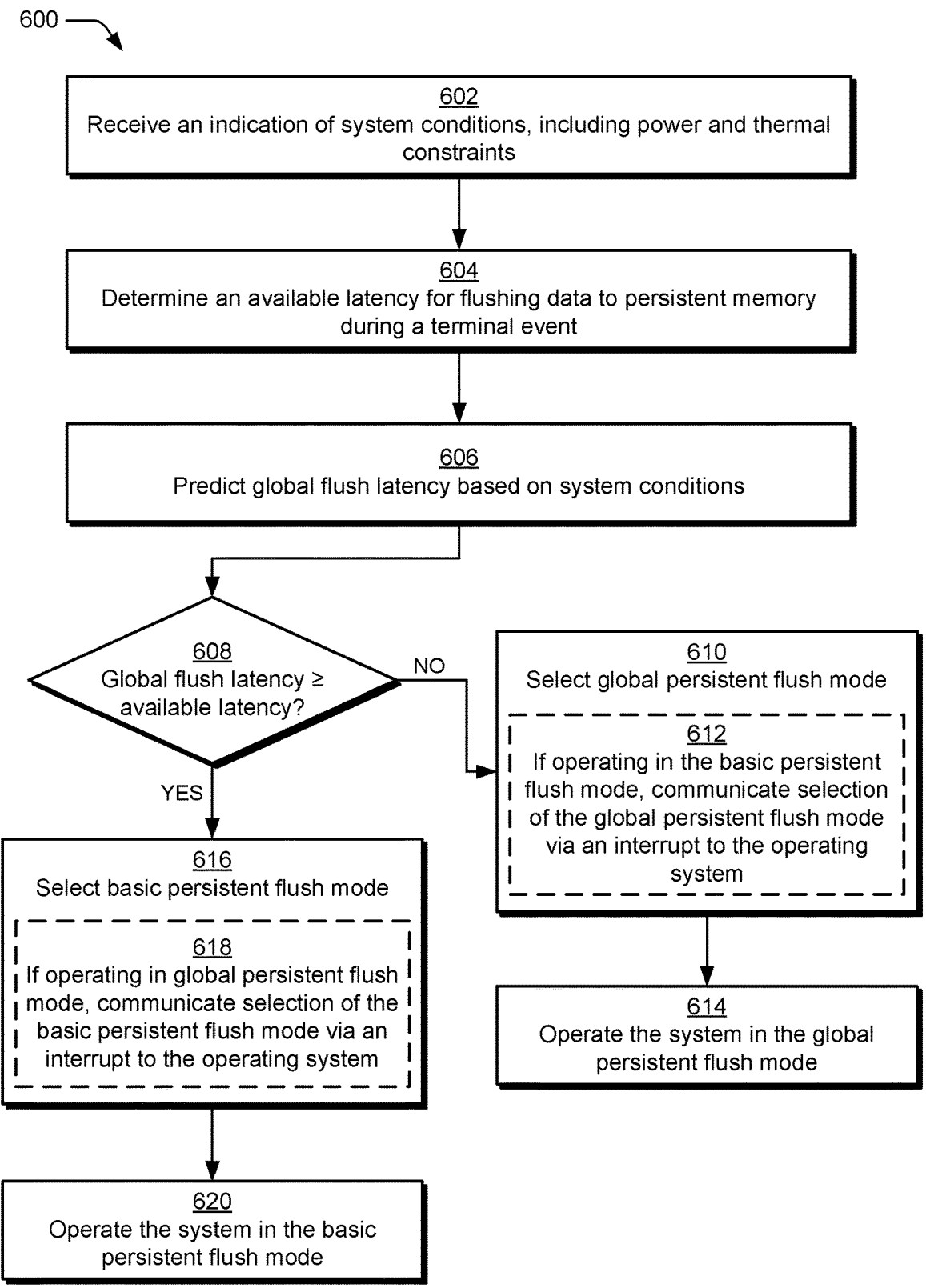
FIG. 6 depicts a procedure in an example implementation of selecting between operating in a basic persistent flush mode and a global persistent flush mode.

FIG. 6 depicts a procedure 600 in an example implementation of selecting between operating in a global persistent flush mode and a basic persistent flush mode in a data processing system (e.g., the data processing system 100). In example implementations, the data processing system is a heterogenous system including a plurality of devices coupled to a data fabric, and each of the plurality of devices has one or more associated caches. As will be elaborated below, the procedure 600 enables a runtime switch between operating in the global persistent flush mode and the basic persistent flush mode based on system conditions without a reboot or reset of the data processing system. In this way, the data processing system can accommodate shorter or longer flushing latencies.

An indication of the system conditions, including power and thermal constraints, is received (block 602). By way of example, the power and thermal constrains are measurable values that are provided to a controller (e.g., the fabric controller 122). In some examples, the power and thermal constraints are associated with a current operating state of the data processing system, such as a pre-defined "hot state" or a pre-defined "maximum power state." Additionally or alternatively, the power constraints include information regarding a back-up capacitor, such as an amount of energy stored therein and/or a latency tolerance of the back-up capacitor.

An available latency for flushing modified data from caches to persistent memory during a terminal event is determined based on the system conditions (block 604). By way of example, the controller receives the indication of the system conditions and, using that data, computes or estimates the available latency for executing a global push to persistence during a terminal event such as a power loss. In example implementations, the controller references one or more look-up tables and/or graphs that relate the system conditions to the available latency for performing the terminal event-triggered global push to persistence to determine the available latency. Additionally or alternatively, the controller inputs the system conditions into a model or formula, which outputs a prediction of the available latency. In some examples, the available latency for the terminal event-triggered global push to persistence is less than for a non-terminal event-triggered global push to persistence, as the terminal event is constrained by an impending power loss, whereas the non-terminal event does not result in a power loss.

A global flush latency is predicted based on the system conditions (block 606). By way of example, the controller predicts the global flush latency based on a cache dirtiness of one or more caches (e.g., every cache) included in a global region of the data processing system (e.g., the global region 104). As discussed with respect to FIG. 4, the global flush latency generally increases as the cache dirtiness increases. Additionally or alternatively, the controller further accounts for the power and thermal operating states of the data processing system in predicting the global flush latency because different power and thermal operating states result in different latencies for flushing a same amount of data, such as described above with respect to FIG. 5. In example implementations, the controller inputs the system conditions (e.g., the cache dirtiness, the power state, and the thermal state) into one or more look-up tables, models, and/or graphs, which outputs the corresponding global flush latency for the input conditions.

It is determined if the predicted global flush latency is greater than or equal to the available latency (block 608). By way of example, the controller directly compares the predicted global flush latency with the available latency to determine if the predicted global flush latency is greater than or equal to the available latency. In variations, the controller adds a pre-determined margin to the predicted global flush latency to provide a buffer for ensuring that the predicted global flush latency does not exceed the available latency. For example, the pre-determined margin is a pre-determined percentage of the predicted global flush latency (e.g., 1-5%) or a pre-determined time value (e.g., a number of milliseconds or microseconds). In some such variations, the controller generates an adjusted predicted global flush latency by adding the pre-determined margin and compares the adjusted predicted global flush latency with the available latency to determine if the predicted global flush latency is greater than or equal to the available latency.

If the predicted global flush latency is not greater than or equal to the available latency (e.g., the predicted global flush latency is less than the available latency), the global persistent flush mode is selected (block 610). If operating in the basic persistent flush mode, the selection of the global persistent flush mode is communicated via an interrupt to the operating system (optional block 612). However, if the data processing system is already operating in the global persistent flush mode, then the selection of the global persistent flush mode is not communicated via the interrupt. As such, the selection of the global persistent flush mode is communicated via the interrupt in order to switch from operating in the basic persistent flush mode to operating in the global persistent flush mode.

The system is operated in the global persistent flush mode (block 614). In accordance with the principles described herein, the data processing system is operated in the global persistent flush mode in response to the global persistent flush mode being selected so that dirty data throughout the global region of the data processing system is automatically flushed to persistence by hardware and firmware commands, such as elaborated above with respect to FIG. 2 and discussed below with respect to FIG. 7.

Returning to block 608, if the predicted global flush latency is greater than or equal to the available latency, the basic persistent flush mode is selected (block 616). If operating in the global persistent flush mode, the selection of the basic persistent flush mode is communicated via an interrupt to the operating system (optional block 618). However, if the data processing system is already operating in the basic persistent flush mode, then the selection of the basic persistent flush mode is not communicated via the interrupt. As such, the selection of the basic persistent flush mode is communicated via the interrupt in order to switch from operating in the global persistent flush mode to operating in the basic persistent flush mode.

The system is operated in the basic persistent flush mode (block 620). In accordance with the principles described herein, the data processing system is operated in the basic persistent flush mode in response to the basic persistent flush mode being selected so that in-flight data within a local region of the data processing system (e.g., local region 106) is flushed to persistence in response to a flush event trigger (e.g., a terminal event trigger). While operating in the basic persistent flush mode, explicit commands from an application are used to get the data in-flight, such as elaborated above with respect to FIG. 3A and as also described discussed below with respect to FIG. 8. In this way, the in-flight data in the local region is pushed to persistence, which is faster (e.g., has a shorter latency) than performing the global flush (e.g., in the global persistent flush mode).

According to the techniques described herein, the procedure 600 is repeated so that the data processing system is adjusted between the global persistent flush mode and the basic persistent flush mode responsive to changes in the operating conditions. As such, in some implementations, a selected persistent flush mode is switched one or more times between a power up of the data processing system (where the data processing system is powered "on" from an "off" state) and a subsequent power down (where the data processing system is powered "off" from an "on state") or reboot. By way of example, the data processing system starts in the global persistent flush mode at a first, initial time, switches to the basic persistent flush mode at a second time in response to the predicted global flush latency being greater than the available latency at the second time, and switches back to the global persistent flush mode at a third time (which is after the second time) in response to the predicted global flush latency decreasing below the available latency at the third time. In some instances, the selected persistent flush mode does not change between the power up and the subsequent power down, such as when the data processing system starts in the global persistent flush mode at the power up and remains in the global persistent flush mode until the power down (e.g., in response to the predicted global flush latency remaining below the available latency through the duration between the power up and the power down).

Figure 7:
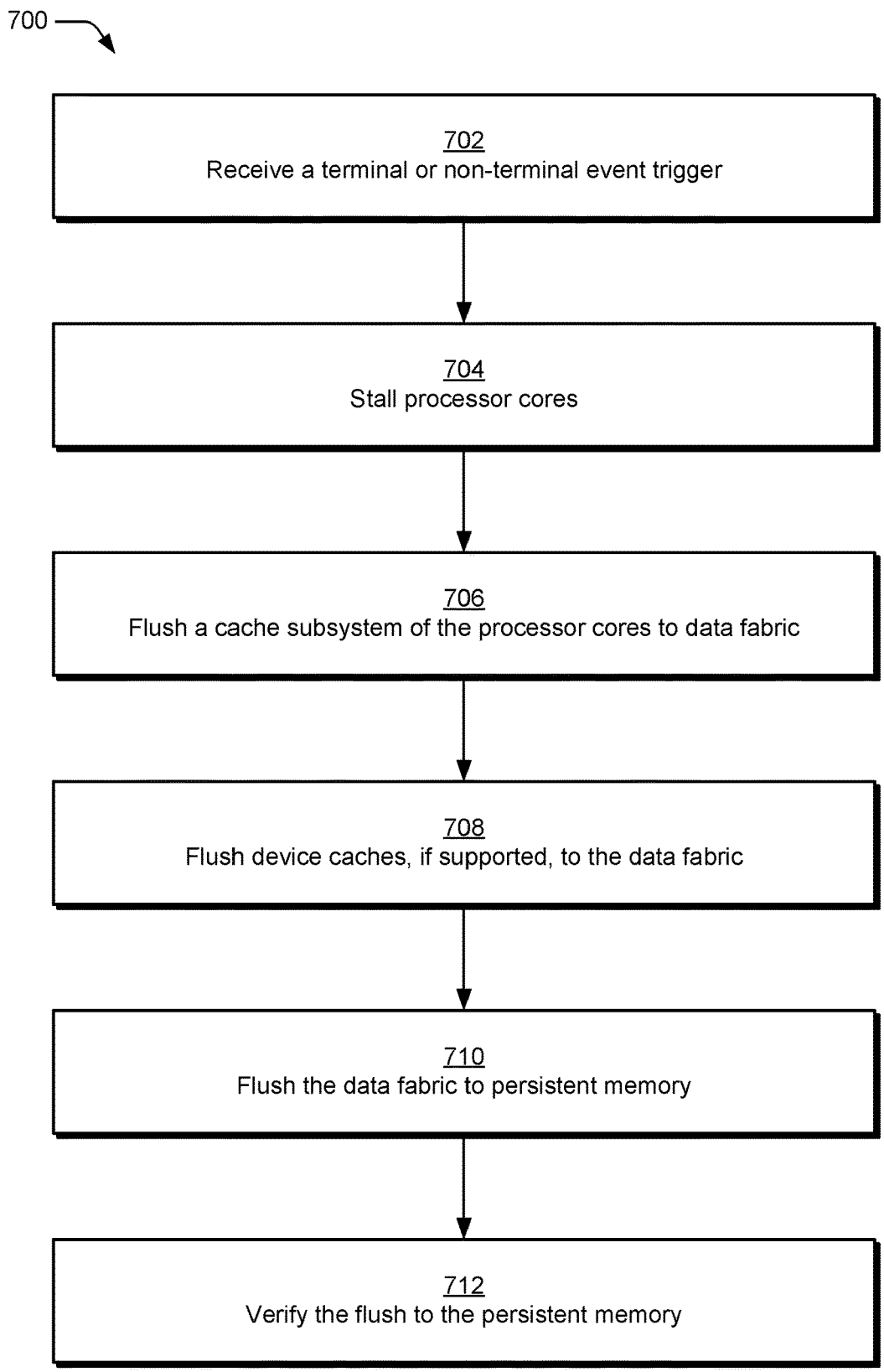
FIG. 7 depicts a procedure in an example implementation of performing a runtime global push to persistence in a SOC.

FIG. 7 depicts a procedure 700 in an example implementation of performing a runtime global push to persistence in a data processing system (e.g., the data processing system 100). The procedure 700 is useful in a SOC (e.g., the SOC 102) according to some implementations to flush caches of a global region (e.g., the global region 104) while operating in a global persistent flush mode.

A terminal or non-terminal event trigger is received (block 702). In accordance with the principles discussed herein, the terminal or non-terminal event trigger is received by a controller (e.g., the fabric controller 122). In some examples, the non-terminal event trigger is initiated by application (e.g., software) requests to write back sensitive data or make modified data globally observable. By way of example, the fabric controller 122 receives the terminal or non-terminal event trigger as a flush event trigger 202, which initiates the runtime global push to persistence process.

Processor cores are stalled in response to a terminal event trigger being received (block 704). As such, if the flush event trigger 202 is a terminal event trigger, the processor cores (e.g., the core 108) are stalled. By way of example, if a multi-core is present, each processor of the multi-core is stalled. Alternatively, if the flush event trigger 202 is a non-terminal event trigger, the processor cores are not stalled, and block 704 is omitted (e.g., skipped).

A cache subsystem of the processor cores is flushed to data fabric (block 706). In accordance with the principles discussed herein, dirty data is flushed from the cache subsystem (e.g., the caching subsystem 116) by sending write requests for the dirty data to the data fabric (e.g., the data fabric 110). In one or more implementations, these requests flow through a fabric transport layer of the data fabric and are temporarily stored in one or more buffers according to corresponding memory mapping locations. In some implementations, the one or more buffers are coherent target circuits. For example, the write requests are stored in a first buffer (e.g., a first coherent target circuit) when the memory is mapped to a first persistent memory or a second buffer (e.g., a second coherent target circuit) when the memory is mapped to a second persistent memory. In a non-limiting example, the first persistent memory is an external device persistent memory, such as is a CXL memory device, and the second persistent memory is a system level memory, such as NVDIMM-P.

Device caches, if supported, are flushed to the data fabric (block 708). By way of example, dirty data is flushed from the cache(s) of external device(s) (e.g., the cache 128 of the first device 124 and the cache 130 of the second device 126) to the data fabric. This action includes reading the dirty data from the external devices into the on-chip data fabric. Similar to that described above, the dirty data from the device caches are sent through the data fabric. In variations, the write requests for the dirty data are sent to a selected buffer in the data fabric 110 based on the memory mapping location (e.g., the first coherent target circuit or the second coherent target circuit described above).

The data fabric is flushed to persistent memory (block 710). By way of example, the runtime global push to persistence process flushes pending write requests in the data fabric by sending the write requests to the persistent memory (e.g., the non-volatile memory 134). In variations, the write requests are sent to more than one persistent memory location based on the memory mapping location.

The flush to the persistent memory is verified (block 712). By way of example, the controller shares a verification signal with the persistent memory. In some examples, the verification signal is a handshake signal with the persistent memory, such as according to CXL protocols. Other verification signals are also possible where the persistent memory acknowledges to the controller that the global push to persistence is completed and the dirty data has been properly written to the persistent memory.

According to the techniques described herein, the procedure 700 is repeated for every flush event trigger while the global persistent flush mode is selected (and the basic persistent flush mode is not selected).

Figure 8:
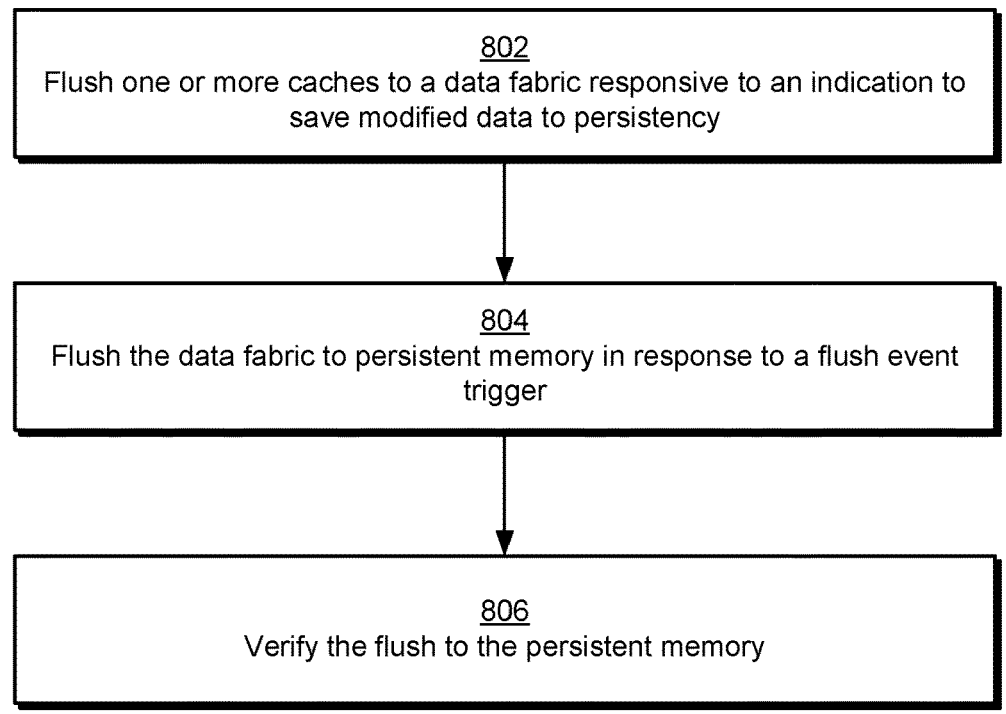
FIG. 8 depicts a procedure in an example implementation of performing a runtime local push to persistence in a SOC.

FIG. 8 depicts a procedure 800 in an example implementation of performing a runtime local push to persistence in a data processing system (e.g., the data processing system 100). The procedure 800 is useful in a SOC (e.g., the SOC 102) according to some implementations while operating in a basic persistent flush mode to get data in-flight within a local region (e.g., the local region 106) and flush the in-flight data from the local region.

One or more caches are flushed to a data fabric responsive to an indication to save modified data to persistency (block 802). By way of example, the one or more caches are flushed to the data fabric (e.g., the data fabric 110) by a command from an application, such as a cache management command 310. As examples, the indication to save the modified data to persistency occurs when the modified data is sensitive data and/or to make the modified data globally observable. In some examples, the application generates the indication to save the modified data to persistency or otherwise decides when to save the modified data to persistency (e.g., according to pre-programmed instructions or code). The indication to save the modified data to persistency is independent of flush event triggers received by a controller (e.g., the fabric controller 122) while operating in the basic persistent flush mode, at least in some variations. In one or more implementations, the application commands one or more or each of the caches in the data processing system to send write requests for the modified, dirty data to the data fabric, thus generating in-flight data in the data fabric. As described above with respect to FIG. 1, the in-flight data in the data fabric is included in the local region of the data processing system.

In variations, these "in-flight" write requests are temporarily stored in one or more buffers according to corresponding memory mapping locations, such as in one or more coherent target circuits. By way of example, the write requests are stored in a first buffer (e.g., a first coherent target circuit) when the memory is mapped to a first persistent memory or a second buffer (e.g., a second coherent target circuit) when the memory is mapped to a second persistent memory. In a non-limiting example, the first persistent memory is an external device persistent memory, such as is a CXL memory device, and the second persistent memory is a system level memory (e.g., NVDIMM-P or another type of non-volatile memory).

The data fabric is flushed to the persistent memory in response to a flush event trigger (block 804). By way of example, the controller receives the flush event trigger and transmits a flush command to the data fabric to push the write requests to the persistent memory. In various implementations, the flush event trigger is a terminal event trigger indicating an impending power loss, and pushing the in-flight data to persistency takes less time than performing the global push to persistence described above with respect to the procedure 700 of FIG. 7.

The flush to the persistent memory is verified (block 806). By way of example, the controller shares a verification signal with the persistent memory. In some examples, the verification signal is a handshake signal with the persistent memory, such as according to CXL protocols. Other verification signals are also possible where the persistent memory acknowledges to the controller that the global push to persistence is completed and the dirty data has been properly written to the persistent memory.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the SOC 102 having the core 108, the caching subsystem 116, the data fabric 110, the external memory interface 112, and the memory controller 114; as well as the first device 124, the second device 126, the device persistent memory 136 and the non-volatile memory 134 external to the SOC 102 and coupled to the data fabric 110) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

In the preceding description, the use of the same reference numerals in different drawings indicates similar or identical items. Unless otherwise noted, the word "coupled" and its associated verb forms include both direct connection and indirect electrical connection. Unless explicitly stated otherwise, any description of direct connection implies alternate examples using suitable forms of indirect electrical connection as well. Example wired connections include, but are not limited to, buses (e.g., a data bus), interconnects, traces, and planes.

What is claimed is:

1. A system comprising:
a data fabric in electronic communication with at least one cache; and
a controller configured to:
select between operating in a global persistent flush mode and a basic persistent flush mode based on an available flushing latency of the system;
control the at least one cache to flush dirty data to the data fabric in response to a flush event trigger while operating in the global persistent flush mode; and
transmit a signal to switch control to an application to flush the dirty data from the at least one cache to the data fabric while operating in the basic persistent flush mode.

2. The system of claim 1, wherein to select between operating in the global persistent flush mode and the basic persistent flush mode based on the available flushing latency of the system, the controller is further configured to:
determine the available flushing latency of the system based at least on a thermal state of the system and a power state of the system;
predict a global flushing latency based on a dirtiness of the at least one cache, the thermal state of the system, and the power state of the system;
select the global persistent flush mode in response to the predicted global flushing latency not exceeding the available flushing latency; and
select the basic persistent flush mode in response to the predicted global flushing latency exceeding the available flushing latency.

3. The system of claim 1, wherein the signal to switch control to the application is an interrupt signal.

4. The system of claim 3, wherein, in response to the interrupt signal, the application transmits commands that cause the at least one cache to send write requests for cache lines that contain the dirty data to the data fabric generate in-flight data in the data fabric.

5. The system of claim 4, further comprising a persistent memory coupled to the data fabric, and wherein the controller is further configured to:
push the in-flight data from the data fabric to the persistent memory in response to receiving the flush event trigger while operating in the basic persistent flush mode.

6. The system of claim 1, wherein to cause the at least one cache to flush the dirty data to the data fabric in response to the flush event trigger while operating in the global persistent flush mode, the controller is further configured to:
transmit a flush command signal to the at least one cache that causes the at least one cache to send write requests for cache lines that contain the dirty data to the data fabric, the write requests comprising in-flight data in the data fabric.

7. The system of claim 6, further comprising a persistent memory coupled to the data fabric, and wherein the controller is further configured to:
push the in-flight data from the data fabric to the persistent memory in response to receiving the flush event trigger while operating in the global persistent flush mode.

8. An apparatus, comprising:
at least one cache of a data processing system; and
a controller configured to:
command the at least one cache to flush modified data to a data fabric while operating in a global persistent flush mode; and
issue an interrupt signal to instruct an application to command the at least one cache to flush the modified data to the data fabric while operating in a basic persistent flush mode.

9. The apparatus of claim 8, wherein the controller is further configured to:
command the modified data to flush from the data fabric to a persistent memory in response to the controller receiving a flush event trigger while operating in the global persistent flush mode; and
command the modified data to flush from the data fabric to the persistent memory in response to the controller receiving the flush event trigger while operating in the basic persistent flush mode.

10. The apparatus of claim 9, wherein the interrupt signal to instruct the application to command the at least one cache to flush the modified data to the data fabric while operating in the basic persistent flush mode instructs the application to command the at least one cache to flush the modified data to the data fabric in response to an indication to save the modified data to the persistent memory that is independent from the flush event trigger.

11. The apparatus of claim 8, wherein the controller is further configured to:
switch between operating in the global persistent flush mode and operating in the basic persistent flush mode based on a predicted latency of flushing the modified data from the at least one cache to a persistent memory relative to an available latency; and
communicate the switching via the interrupt signal.

12. The apparatus of claim 11, wherein to switch between operating in the global persistent flush mode and operating in the basic persistent flush mode based on the predicted latency of flushing the modified data from the at least one cache to the persistent memory relative to the available latency, the controller is further configured to:
operate in the global persistent flush mode in response to the predicted latency being less than the available latency; and
operate in the basic persistent flush mode in response to the predicted latency being greater than or equal to the available latency.

13. The apparatus of claim 11, wherein the controller is further configured to:
determine the available latency based on conditions of the data processing system; and
determine the predicted latency based on a dirtiness of the at least one cache and the conditions.

14. The apparatus of claim 13, wherein the conditions of the data processing system include a thermal state of the data processing system and a power state of the data processing system.

15. A method, comprising:
selecting, by a controller, a global persistent flush mode in response to a predicted global flush latency not exceeding an available latency for flushing caches in a data processing system to persistent memory;
commanding, by the controller, the caches of the data processing system to flush to the persistent memory in response to receiving a flush event trigger while the global persistent flush mode is selected;
selecting, by the controller, a basic persistent flush mode in response to the predicted global flush latency exceeding the available latency for flushing the caches in the data processing system to the persistent memory; and
commanding, by the controller, in-flight data to flush to the persistent memory in response to receiving the flush event trigger while the basic persistent flush mode is selected.

16. The method of claim 15, further comprising:
determining the available latency for flushing the caches of the data processing system to the persistent memory based on a power state of the data processing system and a thermal state of the data processing system; and
determining the predicted global flush latency based on a dirtiness of the caches of the data processing system, the power state of the data processing system, and the thermal state of the data processing system.

17. The method of claim 15, wherein the caches are in electronic communication with the persistent memory via a data fabric, and wherein the in-flight data comprise write requests for dirty data from the caches that are within the data fabric.

18. The method of claim 17, wherein the commanding, by the controller, the caches of the data processing system to flush to the persistent memory in response to receiving the flush event trigger while the global persistent flush mode is selected comprises:
commanding, by the controller, the caches of the data processing system to generate the in-flight data; and
commanding, by the controller, the data fabric to push the in-flight data to the persistent memory.

19. The method of claim 15, further comprising:
transmitting, by the controller, an interrupt signal that causes an application to be notified of whether the global persistent flush mode or the basic persistent flush mode is selected; and
commanding, by the application, the caches of the data processing system to generate the in-flight data while the basic persistent flush mode is selected.

20. The method of claim 19, wherein the commanding, by the application, the caches of the data processing system to generate the in-flight data while the basic persistent flush mode is selected is independent of the controller receiving the flush event trigger.

* * * * *